United States Patent [19]

Lindholm et al.

[11] Patent Number: 5,067,013

[45] Date of Patent: Nov. 19, 1991

[54] PROCEDURE AND APPARATUS FOR LOCATING A CONTAINER FOR LIFTING

[75] Inventors: Mikko Lindholm; Pentti Vähä, both of Oulu, Finland

[73] Assignee: Kone OY, Helsinki, Finland

[21] Appl. No.: 623,767

[22] Filed: Dec. 7, 1990

[30] Foreign Application Priority Data

Dec. 8, 1989 [FI] Finland ................................. 895892

[51] Int. Cl.⁵ ................................................ H04N 7/18

[52] U.S. Cl. ...................................... 358/93; 294/66.2; 294/81.4

[58] Field of Search ................. 358/93, 100, 101, 109, 358/; 294/66.2, 81.41, 81.53, 81.4; 376/248, 260; 907/47

[56] References Cited

U.S. PATENT DOCUMENTS

| | | | |
|---|---|---|---|
| 3,858,728 | 1/1975 | Fathauer | 294/81.41 |
| 3,881,608 | 5/1975 | Hupkes . | |
| 4,139,107 | 2/1979 | Ninomiya et al. . | |
| 4,172,685 | 10/1979 | Nabeshima et al. . | |
| 4,177,964 | 12/1979 | Hajsak et al. | 358/93 |
| 4,245,271 | 1/1981 | Gwin . | |
| 4,358,145 | 9/1982 | Svensson | 294/81.53 |
| 4,460,302 | 7/1984 | Moreau et al. | 358/100 |
| 4,657,728 | 4/1987 | Coppa et al. | 901/47 |
| 4,715,772 | 12/1987 | Kanayama . | |
| 4,843,708 | 7/1989 | Yokoi et al. . | |
| 4,844,681 | 7/1989 | Pierre et al. | 901/47 |

FOREIGN PATENT DOCUMENTS

| | | |
|---|---|---|
| 0254192 | 7/1987 | European Pat. Off. . |
| 0342655 | 5/1989 | European Pat. Off. . |
| 0347784 | 6/1989 | European Pat. Off. . |
| 2053590 | 10/1970 | Fed. Rep. of Germany . |
| 2642373 | 9/1976 | Fed. Rep. of Germany . |
| 2746794 | 10/1977 | Fed. Rep. of Germany . |
| 8417164.2 | 6/1984 | Fed. Rep. of Germany . |
| 2196288 | 3/1974 | France . |
| 2099255 | 5/1981 | United Kingdom . |
| 2113179 | 1/1983 | United Kingdom . |

*Primary Examiner*—Victor R. Kostak

*Attorney, Agent, or Firm*—Fleit, Jacobson, Cohn, Price, Holman & Stern

[57] ABSTRACT

A procedure and apparatus for locating a shipping container to enable a container crane, or other similar container, handling equipment, to be moved into position for the loading device of the container crane to be interlocked with the container, and thereby facilitate lifting and moving the container. The area below the loading device is observed by means of video devices placed in the vicinity of interlocking means of graspers of the loading device such that, based on video data obtained from each video device, the edges and/of corner pieces of the container are recognized. By the aid of the video data, the loading device can be brought into the correct position in relation to the container, so that the interlocking means of the graspers can be fastened to the corner pieces of the container. The invention provides an improved means for ensuring accurate and reliable operation, while reducing the workload and level of skill required by the operator of the crane.

11 Claims, 2 Drawing Sheets

Fig.1
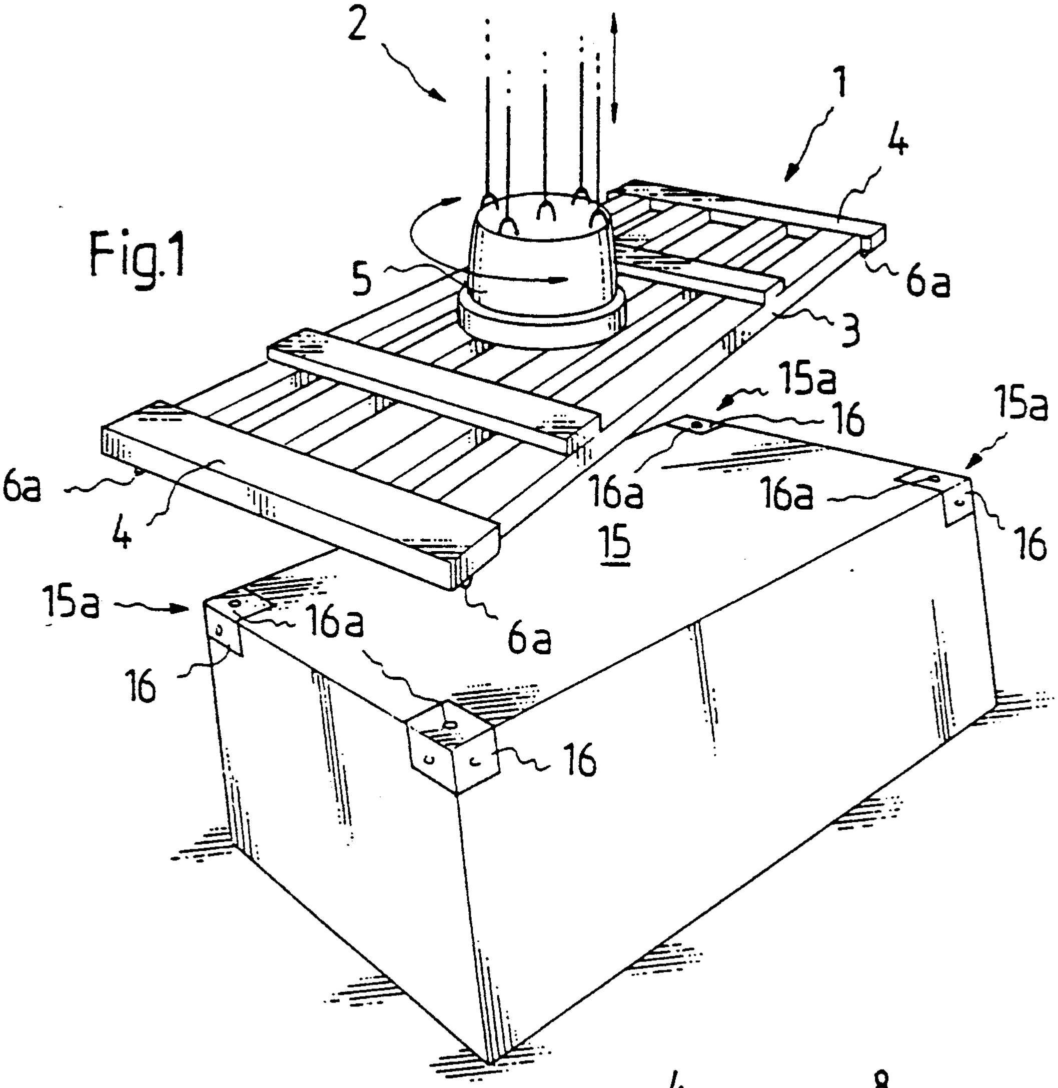
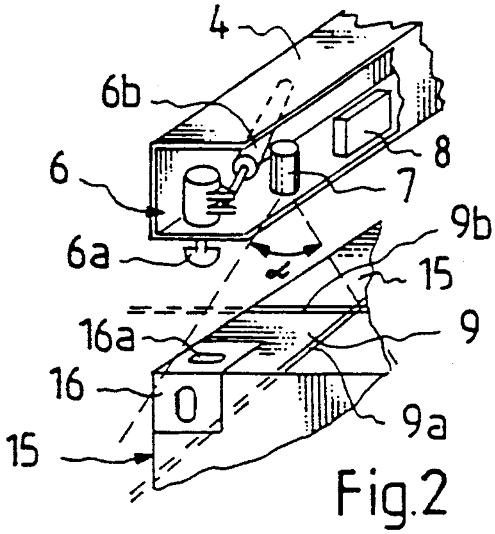
Fig.2
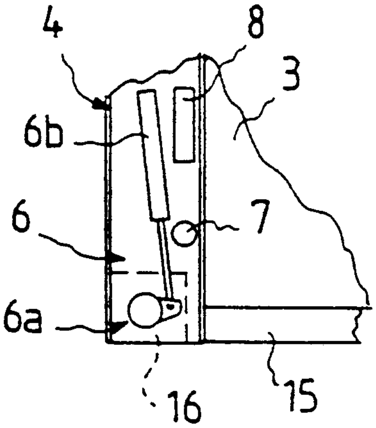
Fig.3

PROCEDURE AND APPARATUS FOR LOCATING A CONTAINER FOR LIFTING

FIELD OF THE INVENTION

The present invention relates to a procedure for locating a container for lifting by a crane or other similar container handling equipment. The invention also relates to an apparatus for implementing the procedure.

BRIEF DESCRIPTION OF THE PRIOR ART

At ports, railway depots and other places, containers are generally handled using container cranes and/or other container handling equipment, by means of which the containers are lifted and moved from one place to another, for example from a ship to a guay or from a railway carriage to a depot area.

A container crane or a similar machine for lifting and moving containers comprises, in addition to the normal lifting and moving apparatus, a loading device for gripping the container, which is connected to the lifting and moving apparatus by ropes or equivalent. The loading device is provided with graspers for engaging corner pieces at the upper corners of the container to be lifted or moved.

In current practice, the operator of the container crane locates the container preliminarily for the lifting operation, whereupon, based on visual observation, the loading device is brought to a position about half a metre above the container. The loading device is provided with mechanical stoppers on its sides and ends. The side stoppers are maintained in a low position, while the loading device is being brought closer and closer to the container. When the stoppers hit the side of the container, the loading device is directly above it. The graspers of the loading device are now moved longitudinally until they reach the end stoppers. The loading device is now exactly aligned with the corner pieces of the container. When the loading device is lowered onto the container, interlocking means are inserted into, and interlocked with, holes in the corner pieces, whereupon the container can be lifted and moved by the crane.

One previously known method for locating a container is the arrangement presented in German patent publication DE-A 2,642,373, in which the crane is provided with a closed-circuit TV camera mounted on the boom. With the aid of the camera and monitor, the crane operator is able to observe the lifting operation A drawback with the current procedures is that they depend upon the operator's abilities and skill. Another drawback is that even a skilled operator's ability to quickly and reliably locate the container may be affected by external conditions, such as the weather and lighting. A further drawback is that the container may have to be located by an operator positioned a relatively long distance away, which diminishes the reliability of the locating procedure.

SUMMARY OF THE INVENTION

The object of the invention is to reduce or eliminate the drawbacks referred to above.

The procedure of the invention comprises a procedure for locating a container, so as to enable the loading device of a container crane, or similar container handling apparatus, to be moved into position for interlocking means of graspers of the loading device to be engaged with corner pieces of the container so as to allow the container to be lifted. The area below the loading device is observed by means of video devices placed in the vicinity of at least two of the interlocking means such that, based on the video data obtained from each video device, the edges and corner pieces of the container can be recognized. Furthermore, by the aid of video information derived from the video data, the loading device can be brought into the correct position in relation to the container and the interlocking means of the graspers can be fastened to the corner pieces of the container.

The apparatus of the invention is adapted to facilitate the reliable performance of the procedure of the invention outlined above. The apparatus of the invention comprises video devices placed in the vicinity of at least two of the interlocking means of the loading device, and directed essentially downwards Each video device advantageously comprises a video camera or an equivalent camera and produces a living (or real time) image of the region directly below the loading device. With this arrangement, when the loading device is brought to a location above the container, its edges and corner pieces may be recognized from the real-time images produced by the camera and, by the aid of this video information, the loading device can brought into the correct position relative to the container and the interlocking means of the graspers can be fastened.

In one embodiment of the invention, the images obtained from the video device are displayed on a monitor. The crane operator then uses the displayed images to manually direct the movement of the loading device, and fastens the graspers of the loading device to the container. To facilitate operations in poor lighting conditions and/or adverse weather conditions, the loading device may be provided with lighting means to illuminate the area below the graspers.

In a second embodiment of the invention, the video information obtained from the video devices is used by appropriate control circuitry such that the interlocking means of the graspers are guided automatically into the holes of the corner pieces of the container and fastened thereto. In this embodiment, the operator of the crane need only guide the loading device into a position a few metres above the container to bring the container into the field of view of the video devices. The final movements of the loading device, and the fastening of the graspers to the container, are performed automatically. To facilitate automated operation, the precise determination of the location of the edges and corners of the container is required. This may be accomplished by the use of one or more laser devices, by means of which at least one strip of laser light is produced for each corner of the container brought into the monitoring area of the camera. On the basis of the laser light strips, the edges and corners of the container are located from the pictures obtained from the cameras.

The invention provides the advantage that it essentially facilitates the work of the crane operator. By simplifying the crane operator's task of directing the movements of the loading device to pick up a container, the possibility of human error is reduced and consequently industrial safety is improved.

Another advantage provided by the invention is that, by making use of the video information obtained from the video device, the loading device can be guided either manually or automatically.

The invention also has the advantage that the containers can readily be located from a relatively long distance away, and the loading device can be reliably brought into contact with the container. The invention thus allows more efficient handling of containers by means of container cranes.

A further advantage of the invention is that the procedure and device are simple to implement and require few components.

BRIEF DESCRIPTION OF THE DRAWINGS

In the following detailed description embodiments of the invention are described, by way of example only, with reference to the appended drawings in which:

FIG. 1 shows diagrammatically the loading device of a container crane;

FIG. 2 shows in more detail one end of a grasper of the loading device, partially opened and in perspective, and, proximal thereto, a corner of a container;

FIG. 3 is a fragmentary plan view of one end of a grasper of the loading device seen partially opened, and a corner of a container;

DESCRIPTION OF THE PREFERRED EMBODIMENTS

Figure 4:
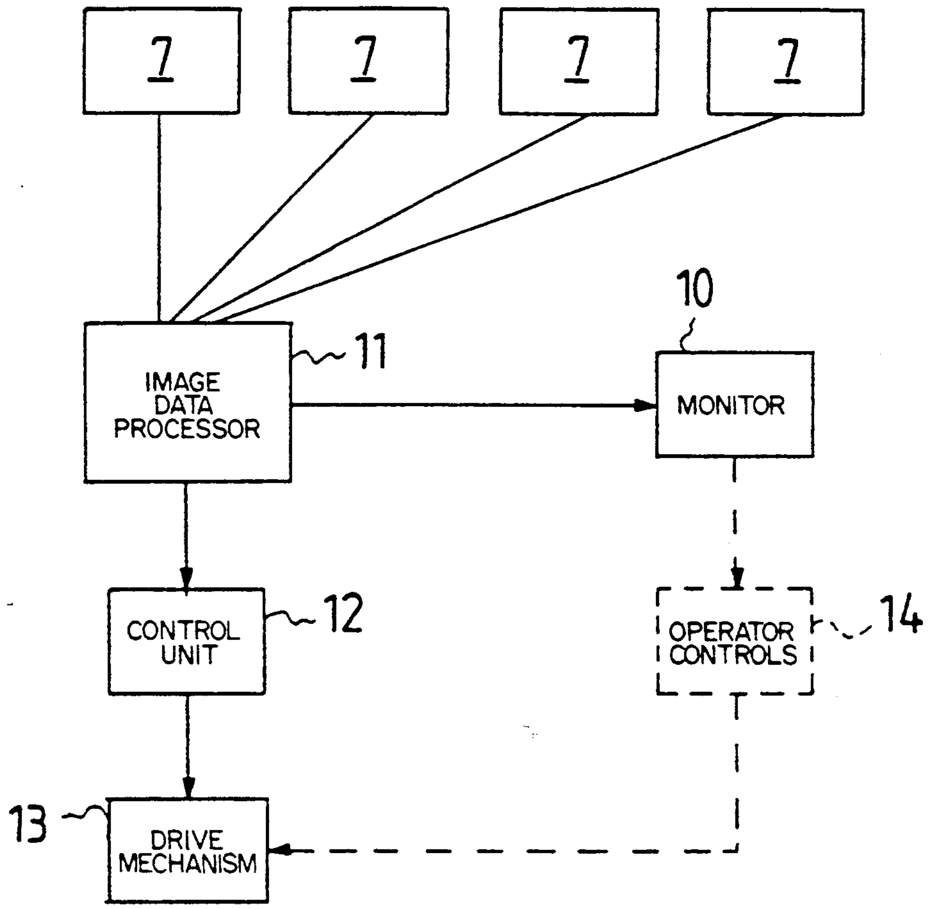
FIG. 4 is a block diagram representing arrangement for automated image processing and control.

FIG. 1 illustrates a loading device of a container crane or an equivalent container handling apparatus. It is attached to hoisting ropes 2 of a crane (not shown in the drawing). The loading device 1 consists of an elongated frame 3, each end of which is provided with a grasper 4. At the middle of the frame 3 is a grasper setting mechanism 5, to which the ropes 2 are attached. The frame 3 is composed of beam-like parts telescopically connected to each other so that the graspers 4 can be moved in the longitudinal direction of the frame 3. The setting mechanism 5 is mounted on the frame 3, preferably using a rotatable joint. With this arrangement, the graspers 4 of the loading device 1 can be moved longitudinally relative to each other and turned through a desired angle relative to the setting mechanism 5. Interlocking means 6 are disposed at the ends of the graspers 4 at each corner of the loading device 1.

FIG. 2 shows one end of a grasper 4, which is provided with an interlocking means 6 having a downwardly-pointing trunnion 6*a* and connected to a turning means, i.e. a hydraulic cylinder 6*b*. In the vicinity of the interlocking means, at a suitable distance from it, is located a video device 7 comprising a camera, for example a CCD camera or equivalent, and a lens system for use in conjunction with it.

The video device 7 is directed mainly downwards from the grasper 4. The optical axis of the video device may be perpendicular to the lower surface of the grasper 4, or it may be disposed at an oblique angle towards the trunnion 6*a* of the interlocking means 6. The angle $\alpha$ of the field of view of the video device 7 is preferably relatively wide, e.g. 55°, to enable the location of corner 15*a* of the container 15 in question to be determined, from a close distance, in relation to the trunnion 6*a* of the interlocking means 6.

Arranged in conjunction with the grasper 4 is a laser device 8 comprising at least one laser and a beam spreader, by means of which a laser beam may be directed downwards from the grasper 4 at a desired angle and processed in such a way that a strip of laser light 9 is produced on the surface of the container below the grasper 4. The beam spreader is implemented using a suitable lens system. Alternatively, it is possible to use a beam deflector, by means of which the laser beam is deflected through a given angle at a desired frequency.

The grasper 4 is so provided with laser devices 8, that at least one laser light strip 9*a* oriented in the longitudinal direction of the grasper 4, and a suitable number, at least two, of laser light beams 9*b* perpendicular to the grasper, are directed at the area below the grasper.

Mounted in conjunction with the lens system of the video device 7 is a band-pass filter preventing the entry into the video device 7 of disturbing radiation of frequencies outside the laser light frequency.

Figure 5:
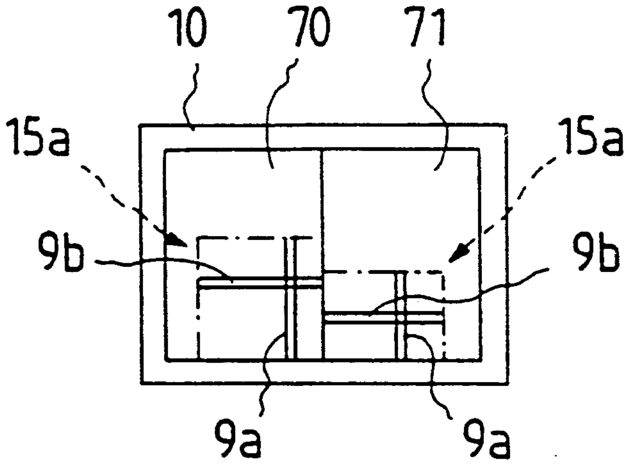
FIG. 5 depicts an image of two corners of a container, produced by two video devices and displayed by one monitor.

The images obtained from the video device 7 are processed in real time at a suitable frequency using an image processing arrangement such as is presented schematically in FIG. 4. The loading device 1, an in particular the graspers 4, are controlled on the basis of the video data obtained from the video devices 7. The video devices 7 are connected to an image data processing unit 11, which processes the video data obtained from them in a suitable manner and outputs the video information to a monitor 10. The monitor 10 is preferably located in the working space 14 of the crane operator. The number of video devices 7 is, for example, one per grasper 4. It should be obvious, however, that there need not be a video device corresponding to every grasper. In principle, only as many video devices need be used as are required to accurately locate the container. For instance, it would be possible to operate the apparatus with two video devices. The video devices are placed on the same side of the loading device, for example on its longer side near the ends close to the interlocking means 6 (for example at a distance of 15 cm from them). In this case, the image data may be so processed that images 70, 71 obtained from the video devices are displayed in the same monitor 10, as illustrated by FIG. 5. Thus the crane operator observes the display of only one monitor 10 and controls the loading device 1 on the basis of the information provided by the display.

In an alternative embodiment, in processing the image data obtained from the video devices 7, the image data processing unit 11 uses a suitable pattern recognition program to recognize the shapes of the laser strips 9*a*, 9*b* and performs appropriate calculations to locate the edges and corners 15*a* of the containers 15. Based on these data, the lifting and/or lowering mechanism of the loading device 1, as well as the grasper setting mechanism 5, are controlled by the control unit 12 so that the loading device 1 is automatically positioned above the container 15 and the interlocking means 6 engaged with corner pieces 16 of the container.

In principle, the above-described apparatus for locating a container works as follows. The operator of the container crane moves the loading device 1 to within a few metres of the container to be lifted. Next, he starts the locating program which, based on the image data obtained from the video devices 7, recognizes the container 15 to be lifted in the following manner. Beams 9*a*, 9*b* of laser light are emitted towards the container from the laser devices 8 near the graspers 4, and the strips of light formed on the upper structure of the container by the beams are observed by the video devices 7. From the images produced by the video devices 7, the image data processing system calculates the ending points of the laser strips, which indicate the location of the edges of the container. As the edges are known to be parallel to each other, the positions of the corners 15*a* of the container can be readily determined from these data, and the locations of the holes 16*a* of the corner pieces 16 of the container 15 thereby recognized. Based on the information thus obtained, driving mechanism 13 of the loading device 1 is controlled by control unit 12, so that the loading device 1 is caused to approach the container 15 and assume the correct position. Simultaneously, the Video information obtained from the video devices 7 is analyzed by the image data processing unit 11, which determines whether the movement of the loading device 1 is proceeding in the appropriate manner. This facilitates automatic correction in the movement of the loading device 1, as well as monitoring of the operation by the crane operator via monitor 10. After the loading device 1 has reached a position close above the container 15 so that the interlocking means 6 of the graspers 4, and in particular the trunnions 6*a*, are immediately above holes 16*a* of the corner pieces 16 of the container 15, as illustrated in FIGS. 2 and 3, the loading device 1 is lowered directly down onto the container so that the trunnions 6*a* of the interlocking means 6 are inserted into the holes 16*a* of the corner pieces 16 of the container. After this, an actuating command is sent to the cylinders 6*b* of the interlocking means 6, whereupon the cylinders 6*b* turn the trunnions 6*a* into a position in which they are interlocked in the holes 16*a* of the corner pieces 16. The crane operator then receives a suitable signal to indicate that the lifting can be started. Alternatively, the lifting operation can also be started automatically.

In an alternative arrangement, the laser strip may be directed transversely across the corner of the container, in which case a single laser strip instead of two (as illustrated in FIG. 2), will suffice for each corner of the container.

The invention is not restricted to the embodiments described above, but instead several variations are possible within the scope of the invention as defined in the following claims.

We claim:

1. Procedure for locating a container to enable the loading device of a container crane, or an equivalent container handling apparatus, to be moved into position for interlocking means of graspers of the loading device to be engaged with corner pieces of the container so as to allow the container to be lifted; wherein the area below the loading device is observed by means of video devices placed in the vicinity of at least two of the interlocking means such that, based on the video data obtained from each video device, the edges and/or corner pieces of the container are recognized, and, by the aid of video information derived from said video data, the loading device is brought into the correct position in relation to the container so that the interlocking means of the graspers can be fastened to the corner pieces of the container.

2. Procedure according to claim 1, wherein video information obtained from the video devices is presented via a monitor to the crane operator, who, by the aid of said information, guides the loading device to the correct position in relation to the container, and then fastens the interlocking means of the graspers to the corner pieces of the container.

3. Procedure according to claim 1, wherein, based on the video data obtained from the video devices, the interlocking means of the graspers are automatically guided into the holes of the corner pieces of the container and fastened therein.

4. Procedure according to claim 1, wherein recognition of the edges and corners of the container is facilitated by the use of illuminating means, provided with the loading device, to illuminate the area below the graspers.

5. Procedure according to claim 4, wherein the illuminating means comprises a laser device by means of which at least one strip of laser light is produced for each corner of the container brought into the monitoring area of a given video device; and, on the basis of the laser light strips, the edges and corners of the container are located from the images obtained from each given video device.

6. Apparatus for locating a container to enable the loading device of a container crane or an equivalent container handling apparatus to be moved into position and interlocking means of graspers of the loading device to be engaged with corner pieces of the container so as to allow the container to be lifted; which comprises video devices placed in the vicinity of at least two of the interlocking means of said loading device and directed essentially downwards, each video device producing a real time image so that the edges and/or corner pieces of the container may be recognized from the real-time images produced by each video device, and, by the aid of the video information derived therefrom, the loading device can be brought into the correct position in relation to the container and the interlocking means of the graspers can be fastened.

7. Apparatus according to claim 6, which comprises a monitor by means of which video data obtained from each video device are presented to the crane operator, who, by the aid of said images, guides the loading device to the correct position in relation to the container, and then fastens the interlocking means of the graspers to the corner pieces of the container.

8. Apparatus according to claim 6, which comprises a control unit, and an image data processing unit by which the edges and/or corner pieces of the container may be recognized on the basis of the video data, and the movements of the loading device automatically controlled so that the interlocking means of the graspers are automatically guided into holes of the corner pieces and fastened therein.

9. Apparatus according to claim 6, wherein the loading device is provided with at least one illuminating means serving to illuminate the area below the graspers.

10. Apparatus according to claim 9, wherein the illuminating means comprises a laser device by means of which at least one strip of laser light is produced for each corner of the container brought into the monitoring area of each video device, the edges and corners of the container being located on the basis of the laser light strips and the images obtained from each video device.

11. Apparatus according to claim 6, wherein each said video device comprises a video camera.

* * * * *